July 8, 1969     A. F. ISRAELSON ET AL     3,454,913

PERMANENT MAGNETIC PULLEY

Filed Nov. 14, 1966

INVENTORS
ARLO F. ISRAELSON
EMERSON J. TENPAS

BY Charles L. Lovercheck
attorney 3,454,913
PERMANENT MAGNETIC PULLEY
Arlo F. Israelson and Emerson J. Tenpas, Erie, Pa., assignors to Eriez Manufacturing Company, Erie, Pa., a corporation of Pennsylvania
Filed Nov. 14, 1966, Ser. No. 594,002
Int. Cl. H01f 7/02, 1/00
U.S. Cl. 335—306      6 Claims

ABSTRACT OF THE DISCLOSURE

A permanent magnet roll having a nonmagnetic shell and axially and circumferentially spaced permanent magnets located therein. The magnets are arranged so that the magnetic field is urged outwardly from the cylindrical envelope.

---

This invention relates to magnetic separators and, more particularly, to the type of magnetic separators known as magnetic pulleys.

Almost without exception, one of the most desirable characteristics of all permanent magnetic pulleys is that they have strong, deep magnetic fields which will capture ferrous contamination through maximum depths of materials carried on the conveyor belts. It is also true that stronger and deeper magnetic fields permit ferrous removal from faster moving burdens on conveyor belts, thus increasing the capacity of a permanent magnetic pulley of any given size and also resulting in lower cost of magnetic separation for any application.

Heretofore, magnet designers have been able to achieve relatively strong and deep fields in permanent magnetic pulleys by skillful use of existing permanent magnet materials; however, without exception, they have had to use excessive amounts of these materials in order to compensate for leakage fields occurring within the magnetic circuits in areas where leakage amounts to waste. This has been true whether the pulley design is such that the magnetic fields of the pulley are parallel or at right angles to the pulley axis.

In the trade terminology, an axial pulley is one wherein the air gap, or the space between north and south poles, runs from one end of the pulley to the opposite end, parallel to the pulley shaft. The polarity configuration then alternates north-south around the pulley circumference. Steel pole plates connected to the faces of the permanent magnets are used in these circuits for reasons of structural rigidity and to assist in shaping the magnetic fields, as well as to permit the magnets to work better in aiding relationship.

A radial design pulley, in the trade terminology, is one where the air gaps between north and south poles run around the pulley circumference. The pole plates connected to the magnets are usually either disk shaped or rings. The polarity arrangement in this type of pulley alternates north-south from one end of the pulley to the opposite end.

The axial type pulley is generally considered for removal of smaller ferrous contamination whereas the radial type, because of its stronger, deeper magnetic fields, is recommended for larger ferrous contamination. Long pieces of iron or steel are generally captured better by radial type pulleys because they align themselves across the air gaps parallel to the pulley axis and are not easily swept off prematurely, either by their own weight or by the nonmagnetic portion of the material being processed.

The invention disclosed herein is a method of constructing magnetic pulleys wherein strong, deep magnetic fields, which equal the strength of previous pulleys, are created at less cost than previous magnetic pulleys; or, when fields stronger and deeper than previous pulleys are desired, these can be produced at no increase in cost over previous pulley designs.

In the pulley design disclosed, both axial and radial, circuits have been invented wherein flux leakage is practically eliminated. It is forced back into the magnetic circuit where it emerges from the magnet poles in the form of deeper and stronger magnetic fields than would exist using previous designs and the same amount of magnet materials.

In this invention, the need for steel pole plates in both types of pulleys has been eliminated, effecting additional cost reduction.

In the radial type, the magnets are arranged in stacks around the pulley circumference much like the spokes of a wheel. Each stack of magnets is attached to a steel back bar which runs axially or parallel to the shaft. Other stacks of magnets are also attached to the back bar spaced an appropriate distance apart across the entire width of the pulley. Therefore, in appearance, the assembly would resemble multiple spoked wheels (without rims) side by side on the shaft.

Disk shaped supports are provided to connect the back bars to the pulley shaft.

The polarity arrangement of the magnets is such that each ring of spokes is of opposite polarity to the adjacent ring of spokes; that is, north-south-north-south across the entire width of the pulley.

Repelling magnets are forced and fastened in place between each ring of magnets (which is between the north and south poles). The polarity of the repelling magnets is such that the north pole is adjacent to a north pole of the main magnets and the south pole is adjacent to a south pole of the main magnets. This arrangement eliminates flux leakage between poles of the main magnets and results in stronger and deeper magnetic fields.

A further advantage of this polarity arrangement is that strong diagonal criss-cross magnetic fields exist between the diagonal north and south poles. This is important because it provides stronger magnetic fields in a criss-cross configuration in addition to the main fields. This results in a pulley wherein the performance is superior in the removal of both large and small ferrous contamination.

The entire assembly is encased in a nonmagnetic cylinder which is attached to nonmagnetic end flanges which are, in turn, attached to the pulley shaft.

In the axial type, stacks of magnets are arranged side by side in an axial direction, attached to a common steel back bar which could be in the shape of a cylinder with flat surfaces machined around the circumference for attaching the magnets. The cylinder could be a weldment or a casting. Nonmagnetic supports are used to attach the cylinder to the pulley shaft.

The magnet poles extend axially from one end of the pulley to the opposite end. Circumferentially, the polarity arrangement is alternate north and south.

Between each north and south pole around the circumference, repelling magnets are forced and fastened in place. These repelling magnets extend from one end of the pulley to the opposite end and their polarity is such that the north pole is adjacent to a north pole of the main magnets and the south pole is adjacent to a south pole of the main magnets. The repelling magnets eliminate flux leakage between poles of the main magnets, which results in stronger and deeper magnetic fields.

The entire assembly is encased in a nonmagnetic cylinder which is attached to nonmagnetic end flanges which are, in turn, attached to the pulley shaft.

It is important that the permanent magnet materials used in these new pulley designs have very high coercive characteristics because they must be able to resist the brief but strong demagnetizing force that occurs while the repelling magnets are being forced between poles of the main magnets.

It is, accordingly, an object of the present invention to provide an improved magnetic separator.

Another object of the invention is to provide an improved magnetic pulley.

Yet another object of the invention is to provide a magnetic roll which is simple in construction, economical to manufacture, and simple and efficient to use.

A further object of the invention is to provide a magnetic roll having an improved magnetic field pattern.

Still a further object of the invention is to provide a magnetic pulley having a deeper magnetic field in an axial direction.

Still yet a further object of the invention is to provide a magnetic pulley having a deeper field in a radial direction than those heretofore.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
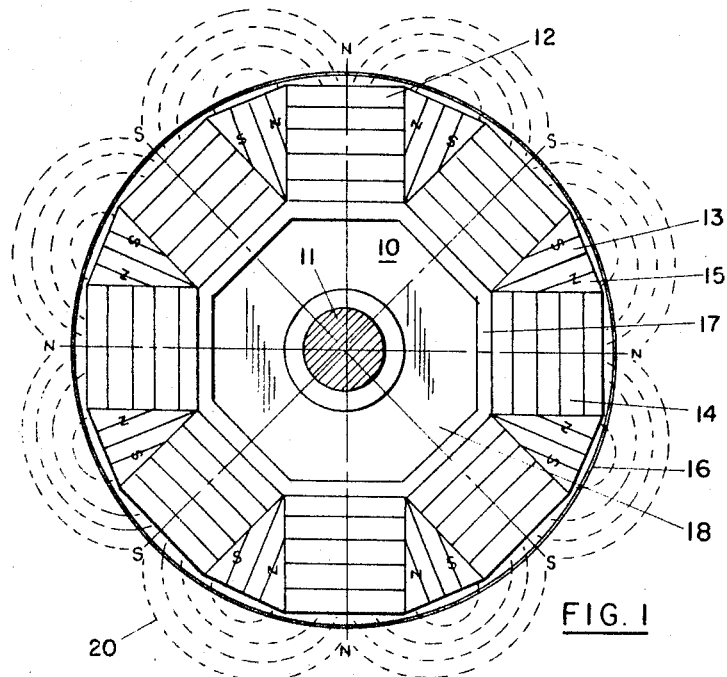
FIG. 1 is an end view showing a schematic diagram of a roll according to the invention.

Now with more particular reference to the drawing, a magnetic roll 10 has a back bar 17 in the form of an octagon shaped member shown by way of example. It could, however, be any number of sides or it could be circular. This back bar 17 is supported on a shaft 11 and fixed to rotate therewith. The back bar will generally be made of magnetic material. The back bar is supported on the nonmagnetic supporting structure 18 which supports it on the shaft 11.

First magnets 12 are made of permanent ceramic material in the form of flat plate like pieces indicated at 14. This may be permanent ceramic magnetic material of the type commonly known to those skilled in the art. The second magnetic magnets 13 are supported between the first magnet 12 and they are made of magnetic elements 15 which are plate like members extending perpendicular to the members 14.

A nonmagnetic shell 16 forms a cylindrical envelope for the magnets shown. The second magnetic members 15 can be considered to be field shaping magnets which are placed between the poles of the first magnet members to direct leakage flux into working areas resulting in a stronger magnetic field than heretofore possible.

The fields of the first magnetic members 12 will be north at the center and south at the outside on each alternate magnet and vice versa so that a horseshoe shaped field extends outward as indicated at 20. The field shaping members will have the north poles and south poles as indicated so that a north pole of a field shaping member magnet 15 will be adjacent a like pole on the outer end of a main magnet or first magnet 12. Thus, the field will extend in a radial direction as shown in FIG. 1.

Figure 2:
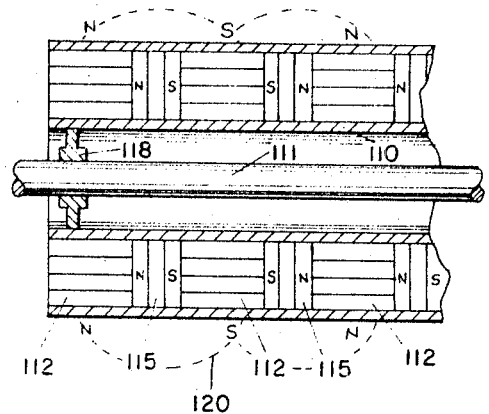
FIG. 2 is a longitudinal cross sectional view taken on line 2—2 of FIG. 3 of another embodiment of the invention.
Figure 3:
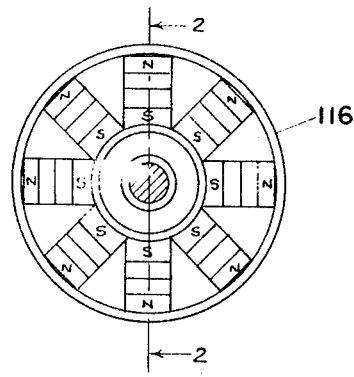
FIG. 3 is an end schematic view of the embodiment of the invention shown in FIG. 2.
Figure 4:
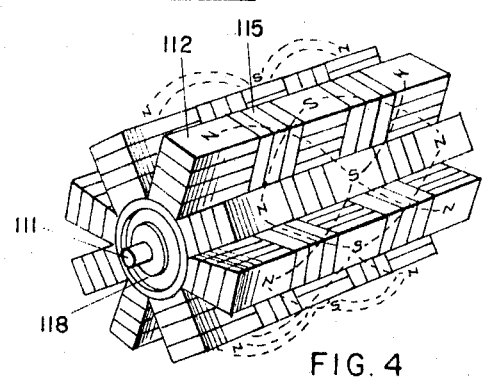
FIG. 4 is an isometric view of the roll of FIG. 2.
Figure 5:
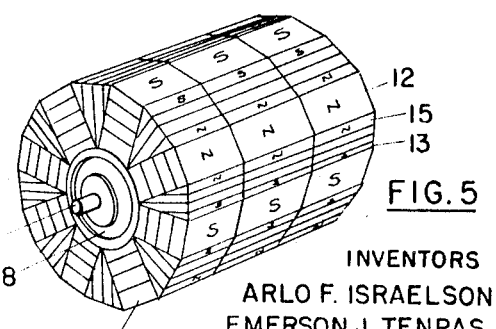
FIG. 5 is an isometric view of the roll of FIG. 1.

In the embodiment of the invention shown in FIGS. 2, 3 and 4, the back bar 110 is supported on the shaft or axle 111 by means of nonmagnetic support members 118. The first permanent magnets 112 are attached to the back bars 110 and are made up preferably of plate like sheets of permanent material the side next to the back bar being one polarity and the outer ends of the first magnets 112 being another polarity. The polarities of the alternate permanent magnets 112 will be opposite as indicated in FIG. 2 so that a plurality of horseshoe shaped fields will extend as indicated at 120.

A nonmagnetic shell 116 forms a cylindrical envelope for the magnets shown. The second magnets or field shaping magnets 115 are disposed between the first permanent magnets 112 as shown. These field shaping magnets may be in the form of rings and the polarity of these magnets is opposite along opposite ends so that a like pole of the magnets 115 is adjacent a like pole at the outer ends of the magnets 112. Thus, the fields from the magnets 112 are forced outward and leakage flux is eliminated.

It will also be noted that the horseshoe shaped fields extend in a plurality of radially extending fields extending along the direction of the axis of the pulley.

The foregoing specification sets forth the invention in its preferred practical forms but the structure shown is capable of modification within a range of equivalents without departing from the invention which is to be understood is broadly novel as is commensurate with the appended claims.

We claim:

1. A magnetic roll comprising:
a plurality of first permanent magnets and a plurality of second permanent magnets,
and means to support said magnets inside a space defined by a cylindrical envelope,
said first permanent magnets being disposed in axially and circumferentially spaced relation to each other and with the ends which are remote from the central axis of said cylindrical envelope adjacent said cylindrical envelope,
said second permanent magnets being disposed in axial and circumferential spaced relation to each other,
said second permanent magnets being disposed in the axial spaces between said first permanent magnets,
the ends of said first permanent magnets remote from said axis being of opposite polarity to the ends of said first permanent magnets radially adjacent thereto,
said second permanent magnets each having a polarity on one axially disposed side opposite the polarity thereof on its opposite axially disposed side,
the polarity of each said second permanent magnet on each axial side being the same as the outer end of the said first permanent magnet adjacent thereto whereby the magnetic field from one said first permanent magnet to another is urged outwardly from said cylindrical envelope.

2. The roll recited in claim 1 wherein:
each of said first permanent magnets is made up of a plurality of magnet elements stacked on each other and disposed radially of said cylindrical envelope.

3. The roll recited in claim 1 wherein:
a back bar member made of magnetic material is provided,
and said first permanent magnets are fixed to said back bar member.

4. The roll recited claim 3 wherein:
a shaft is fixed to said back bar member and disposed generally coextensive with said axis.

5. The roll recited in claim 4 wherein:

a cylindrical shell made of nonmagnetic material is disposed around said magnets and makes up a cylindrical envelope therefor.

6. The magnetic roll recited in claim 1 wherein said first permanent magnets are disposed in circumferential rows, the outer ends of said first permanent magnets in each said circumferential row having the same polarity, and the outer ends of each said first permanent magnets in each said circumferential row being of opposite polarity to the said first permanent magnets in the circumferential row adjacent thereto.

References Cited

UNITED STATES PATENTS

| | | | |
|---|---|---|---|
| 2,895,092 | 7/1959 | Cluwen | 335—304 |
| 3,168,686 | 2/1965 | King et al. | 335—306 |
| 3,365,599 | 1/1968 | Brezezinski et al. | 335—304 XR |

BERNARD A. GILHEANY, *Primary Examiner.*

D. M. MORGAN, *Assistant Examiner.*